US 10,625,824 B2

United States Patent
Frizlen

(10) Patent No.: US 10,625,824 B2
(45) Date of Patent: Apr. 21, 2020

(54) METHOD AND SYSTEM FOR DETERMINING DISPLACEMENT OF AN ANCHOR

(71) Applicant: Thomas Frizlen, Bremgarten AG (CH)

(72) Inventor: Thomas Frizlen, Bremgarten AG (CH)

( * ) Notice: Subject to any disclaimer, the term of this patent is extended or adjusted under 35 U.S.C. 154(b) by 0 days.

(21) Appl. No.: 16/246,097

(22) Filed: Jan. 11, 2019

(65) Prior Publication Data

US 2019/0217924 A1 Jul. 18, 2019

(30) Foreign Application Priority Data

Jan. 13, 2018 (CH) ..................................... 0036/18

(51) Int. Cl.
| | |
|---|---|
| *B63B 21/00* | (2006.01) |
| *B63B 21/22* | (2006.01) |
| *G06T 7/246* | (2017.01) |
| *G01H 3/10* | (2006.01) |
| *G01S 11/14* | (2006.01) |
| *G08B 21/18* | (2006.01) |

(52) U.S. Cl.
CPC .............. *B63B 21/00* (2013.01); *B63B 21/22* (2013.01); *G01H 3/10* (2013.01); *G01S 11/14* (2013.01); *G06T 7/246* (2017.01); *G08B 21/182* (2013.01); *B63B 2021/008* (2013.01); *B63B 2021/009* (2013.01); *B63B 2201/26* (2013.01); *B63B 2203/00* (2013.01)

(58) Field of Classification Search
None
See application file for complete search history.

(56) References Cited

U.S. PATENT DOCUMENTS

| 4,090,462 A | * | 5/1978 | Mount | B63B 21/22 114/293 |
| 4,140,991 A | | 2/1979 | Singleton et al. | |
| 4,154,187 A | * | 5/1979 | Taylor | B63B 21/40 114/304 |

(Continued)

FOREIGN PATENT DOCUMENTS

| AU | A31633/84 | 2/1986 |
| AU | 199655052 | 11/1996 |

(Continued)

OTHER PUBLICATIONS

Bonde, et al., "Air Deployed Oceanographic Mooring-AB1034", CH 1972-9/83/0000-0237, 1983 IEEE, pp. 237-250.

(Continued)

*Primary Examiner* — Fekadeselassie Girma
(74) *Attorney, Agent, or Firm* — Stradley Ronon Stevens & Young, LLP

(57) ABSTRACT

A method for determining a displacement of an anchor is provided. The method includes the steps of: determining an initial position of the anchor; and determining a displacement of the anchor. The step of determining the displacement of the anchor includes (i) measuring anchor velocity values, (ii) measuring at least one further physical quantity associated with the anchoring, (iii) deciding whether the anchor is at rest or in motion, wherein a value of the further physical quantity is taken into account in the decision, and (iv) integrating the velocity values over time during intervals when the anchor is deemed to be in motion.

13 Claims, 1 Drawing Sheet

(56) References Cited

U.S. PATENT DOCUMENTS

| | | | | |
|---|---|---|---|---|
| 4,301,760 | A * | 11/1981 | Cassone | G05D 1/0208 |
| | | | | 114/144 B |
| 4,433,635 | A * | 2/1984 | Takahashi | B63B 21/32 |
| | | | | 114/301 |
| 4,912,464 | A | 3/1990 | Bachman | |
| 5,062,375 | A | 11/1991 | Makielski | |
| 5,077,696 | A | 12/1991 | McEachern et al. | |
| 5,445,103 | A | 8/1995 | Bleth et al. | |
| 5,491,636 | A | 2/1996 | Robertson et al. | |
| 5,803,008 | A | 9/1998 | Georgens et al. | |
| 5,894,450 | A | 4/1999 | Schmidt et al. | |
| 5,970,901 | A | 10/1999 | Bruce | |
| 6,100,921 | A * | 8/2000 | Rowley | B63C 11/49 |
| | | | | 348/148 |
| 6,142,841 | A | 11/2000 | Alexander, Jr. et al. | |
| 6,374,765 | B1 | 4/2002 | Marotta | |
| 6,446,003 | B1 | 9/2002 | Green et al. | |
| 6,459,992 | B1 | 10/2002 | Freedman et al. | |
| 6,472,983 | B1 * | 10/2002 | Grunder | B63B 21/00 |
| | | | | 340/531 |
| 6,678,589 | B2 | 1/2004 | Robertson et al. | |
| 6,728,632 | B2 | 4/2004 | Medl | |
| 6,810,826 | B1 | 11/2004 | Bellis, Jr. | |
| 7,121,222 | B1 * | 10/2006 | Johnston | B63B 21/22 |
| | | | | 114/293 |
| 7,366,593 | B2 | 4/2008 | Fujimoto et al. | |
| 7,376,507 | B1 | 5/2008 | Daily et al. | |
| 7,516,713 | B1 * | 4/2009 | Franta | B63B 21/22 |
| | | | | 114/230.26 |
| 8,055,193 | B2 | 11/2011 | Rhodes et al. | |
| 8,340,830 | B2 | 12/2012 | Hayes et al. | |
| 8,924,054 | B1 | 12/2014 | Arbuckle et al. | |
| 9,074,892 | B2 | 7/2015 | Fink | |
| 9,250,082 | B2 * | 2/2016 | Frizlen | B63B 21/22 |
| 2002/0140670 | A1 * | 10/2002 | Albeck | G01C 11/00 |
| | | | | 345/156 |
| 2003/0128138 | A1 | 7/2003 | Grunder | |
| 2005/0052951 | A1 * | 3/2005 | Ray | G01V 1/166 |
| | | | | 367/188 |
| 2006/0207488 | A1 * | 9/2006 | Haas | B63B 21/22 |
| | | | | 114/267 |
| 2007/0042790 | A1 | 2/2007 | Mohi et al. | |
| 2007/0089660 | A1 | 4/2007 | Bradley et al. | |
| 2007/0106462 | A1 | 5/2007 | Blain et al. | |
| 2008/0239869 | A1 | 10/2008 | Lohrmann et al. | |
| 2011/0087450 | A1 | 4/2011 | Borenstein et al. | |
| 2012/0008866 | A1 * | 1/2012 | Halimeh | G06K 9/00791 |
| | | | | 382/190 |
| 2012/0033096 | A1 * | 2/2012 | Jelinek | G06T 5/003 |
| | | | | 348/222.1 |
| 2012/0051655 | A1 * | 3/2012 | Oto | G06K 9/481 |
| | | | | 382/199 |
| 2012/0072038 | A1 | 3/2012 | Kolar et al. | |
| 2012/0229597 | A1 * | 9/2012 | Gagel | G06T 15/205 |
| | | | | 348/36 |
| 2013/0271301 | A1 * | 10/2013 | Kabel | B63B 49/00 |
| | | | | 340/987 |
| 2013/0301737 | A1 * | 11/2013 | Kondow | H04N 19/13 |
| | | | | 375/240.16 |
| 2013/0301909 | A1 | 11/2013 | Sato | |
| 2014/0222336 | A1 * | 8/2014 | Frizlen | B63B 21/22 |
| | | | | 701/527 |
| 2014/0244169 | A1 * | 8/2014 | Stahlin | G01C 21/20 |
| | | | | 701/523 |
| 2015/0116496 | A1 * | 4/2015 | Ottaviano | H04N 7/185 |
| | | | | 348/148 |
| 2015/0237481 | A1 * | 8/2015 | Ben-Moshe | G01S 1/70 |
| | | | | 455/456.1 |
| 2015/0350849 | A1 * | 12/2015 | Huang | H04W 4/04 |
| | | | | 455/456.1 |
| 2017/0243366 | A1 * | 8/2017 | Imagawa | G06T 7/73 |
| 2018/0004209 | A1 * | 1/2018 | Akuzawa | B63B 45/00 |
| 2018/0204331 | A1 * | 7/2018 | Omari | G06T 7/248 |
| 2018/0244354 | A1 * | 8/2018 | Opshaug | B63B 22/18 |
| 2018/0259339 | A1 * | 9/2018 | Johnson | G01C 21/005 |
| 2019/0072211 | A1 * | 3/2019 | Wang | B63B 39/00 |
| 2019/0118387 | A1 * | 4/2019 | Morita | B25J 9/1682 |
| 2019/0147246 | A1 * | 5/2019 | Bossut | H04L 51/32 |
| | | | | 382/103 |
| 2019/0251356 | A1 * | 8/2019 | Rivers | G06K 9/00671 |

FOREIGN PATENT DOCUMENTS

| | | |
|---|---|---|
| CN | 104064056 | 9/2014 |
| DE | 3810084 | 10/1989 |
| DE | 10064419 | 7/2002 |
| DE | 202011002391 | 5/2011 |
| DE | 202017000018 | 3/2017 |
| EP | 0174189 | 3/1986 |
| EP | 2765074 | 8/2014 |
| WO | 2007020523 | 2/2007 |

OTHER PUBLICATIONS

European Search Report issued in EP 14154136.7 dated Jul. 11, 2014.

Liu, et al., "Experimental investigation on the penetration mechanism and kinematic behavior of drag anchors", Applied Ocean Research, 32 (2010) pp. 434-442.

Nilsson, et al., "Foot-mounted INS for Everybody—An Open-Source Embedded Implementation", 2012 IEEE/ION Position Location and Navigation Symposium (PLANS), Myrtle Beach, SC, Apr. 23-26, 2012, pp. 140-145.

Swiss Search Report issued in CH707573 dated May 10, 2013.

European Search Report issued in EP 19020016.2 dated May 10, 2019.

Zhao, et al., "Motion Measurement Using Inertial Sensors, Ultrasonic Sensors, and Magnetometers With Extended Kalman Filter for Data Fusion", IEEE Sensors Journal, New York, NY, May 2012, vol. 12 No. 5, pp. 943-953.

* cited by examiner

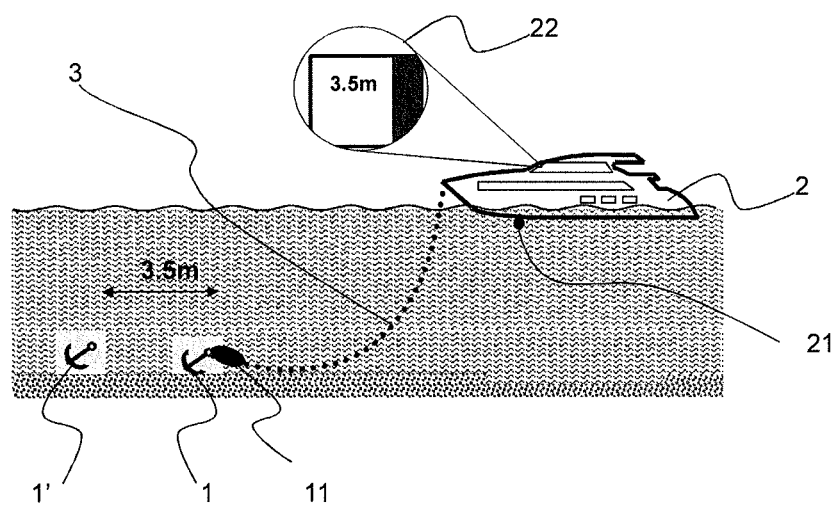

METHOD AND SYSTEM FOR DETERMINING DISPLACEMENT OF AN ANCHOR

CROSS REFERENCE TO RELATED APPLICATIONS

This application claims priority to Swiss Patent Application Number CH00036/18 filed Jan. 13, 2018. The disclosure of this application is hereby incorporated by reference in its entirety.

FIELD

The present invention pertains to the field of anchoring of water vessels. It relates to a method and system for determining displacement of an anchor, and to use of a velocity sensor for determining a displacement of an anchor.

BACKGROUND

Reliable anchoring is an important requirement for all kinds of water vessels, in particular rafts, boats, and ships, but also floating platforms and other semi-stationary objects. If one or more anchors come loose, significant damage can result to the water vessel, other water vessels, and/or crew, passengers etc.

Various methods for anchor monitoring have therefore been suggested.

U.S. Pat. No. 4,912,464 suggests an alarm system comprising a motion sensor connected to an anchor, and configured to monitor a motion signal produced by said motion sensor and raise an alarm under certain conditions, in particular when an acceleration above a threshold occurs.

U.S. Patent Application Publication No. 2003/0128138 A1 discloses a device that generates an alarm when a condition at an anchor or an anchor chain exceeds a set value, in particular when a jerk exceeds a predetermined measure, or when a predetermined force is exceeded.

DE 100 64 419 A1 discloses a movement or inclination monitoring device that has two or more base bodies, such as an anchor and its chain, that are directly or indirect connected, and two or more measurement elements that are used for continuous measurement of the acceleration of one or more base bodies, measurement of angles α of the base body axes relative to the gravitational force vector, a rotation β around a body axis, or a rate of rotation relative to α and/or β. The measurement elements are linked by cable or in a wireless manner. If a variation in acceleration, angle, rotation angle, or rotational velocity exceeds a predetermined threshold, an alarm signal may be displayed.

DE 38 10 084 A1 describes an alarm device which indicates the breaking loose or slippage of an anchor, said alarm having a position encoder (displacement sensor) which is connected to the anchor and rests with a wheel on the anchor (holding) ground and transmits the breaking away or slippage of the anchor to a signaling device present in the water craft via a pulse generator and a transmission device, such as a cable or in a wireless fashion, e.g., by ultrasound.

However, the quantities measured in the state of the art do not correlate optimally with a displacement of an anchor, and thus, in particular, do not correlate optimally with a reliability of the anchoring. In particular, anchoring may remain reliable if very high forces or jerks occur: the anchor may remain at least essentially stationary under such conditions. Under such conditions, state of the art devices may trigger false alarms. On the other hand, if an anchor has never made firm contact with the ground, both boat and anchor may slowly drift, and the anchor may thus be significantly displaced, without large forces or jerks occurring on the anchor or anchor chain, or without wheels or other rotatable elements attached to the anchor being rotated. Such situations may thus go undetected with the methods and devices according to the state of the art as described above.

SUMMARY

It is thus an object of the invention to allow for determination of a displacement of an anchor, in particular to allow for accurate and reliable determination of displacement without the disadvantages as detailed above.

The above objects are achieved by a method and a system for determining a displacement of an anchor and by use of a velocity sensor for determining a displacement of an anchor.

In addition, the invention allows for dependable monitoring of an anchoring reliability and/or stability.

Embodiments of the present invention as described above may in particular be realized as and/or in combination with the variants as listed below:

Embodiment 1: A method for determining a displacement of an anchor, the method comprising the steps of: (a) determining an initial position of the anchor; and (b) determining a displacement of the anchor by (i) measuring anchor velocity values, (ii) measuring at least one further physical quantity associated with the anchoring, (iii) deciding whether the anchor is at rest or in motion, wherein a value of the further physical quantity is taken into account in the decision, and (iv) and during intervals when the anchor is deemed to be in motion, integrating the velocity values over time.

Embodiment 2: The method according to Embodiment 1, characterized in that in step (b)(i), the velocity values are measured by a velocity sensor.

Embodiment 3: The method according to one of the preceding Embodiments, further comprising the step of ignoring anchor velocity values measured during intervals when the anchor is deemed to be at rest.

Embodiment 4: The method according to one of the preceding Embodiments, further comprising the step of correcting the integration of the velocity values based on the anchor velocity values measured during intervals when the anchor is deemed to be at rest.

Embodiment 5: The method according to one of the preceding Embodiments, wherein the step of measuring at least one further physical quantity comprises measuring vibrations of the anchor, and/or measuring a force exerted onto the anchor through an anchor rode, and/or measuring an underwater pressure at a location of the anchor.

Embodiment 6: The method according to one of the preceding Embodiments, wherein the step of measuring at least one further physical quantity comprises measuring a distance between the anchor and a fixed reference point, in particular measuring a distance between the anchor and a water vessel.

Embodiment 7: The method according to one of the preceding Embodiments, wherein the step of measuring at least one further physical quantity comprises measuring an inclination or orientation of the anchor.

Embodiment 8: A method for monitoring an anchoring reliability, the method comprising the steps of: (a) determining a displacement of an anchor according to one of Embodiments 1 to 7, and (b) generating a warning message or signal if the displacement exceeds a predetermined alarm threshold.

Embodiment 9: A system for determining a displacement of an anchor, the system comprising: (a) a measurement unit for being attached to an anchor and/or an anchor rode, the measurement unit comprising: (i) a velocity sensor for acquiring velocity data, (ii) one or more auxiliary sensors for measuring at least one further physical quantity associated with the anchoring; and (b) an evaluation unit, in particular for being installed or placed inside a water vessel or in the measurement unit and configured to receive the velocity data, the evaluation unit being configured to (i) determine anchor velocity values from the acquired velocity data, and (ii) execute the method according to one of Embodiments 1 through 8.

Embodiment 10: The system according to Embodiment 9, further comprising a display configured to display the displacement and/or an absolute movement, for example, an absolute value of the displacement, of the anchor.

Embodiment 11: The system according to Embodiment 9 or 10, further comprising a display configured to display the displacement of the anchor as a function of time, force, position, distance, depth and/or orientation.

Embodiment 12: The system according to one of Embodiments 9 to 11, configured to generate a warning message or signal if the displacement, in particular an absolute value of the displacement, exceeds a predetermined alarm threshold.

Embodiment 13: The system according to one of Embodiments 9 to 12, wherein the one or more auxiliary sensors includes at least one of a pressure sensor for measuring underwater pressure; a vibration sensor for measuring vibrations of the anchor; an ultrasound sensor, in particular for measuring a distance between anchor and vessel; and a force sensor for measuring a force exerted onto the anchor through an anchor rode.

Embodiment 14: Use of an velocity sensor for determining a displacement of an anchor by integrating, preferably numerically, measured velocity values over time; preferably in a method according to one of Embodiments 1 through 8.

Embodiment 15: A system for determining a displacement of an anchor, the system comprising: (a) a measurement unit for being attached to an anchor or an anchor rode, the measurement unit including (i) a velocity sensor for acquiring velocity data, and (ii) one or more auxiliary sensors; and (b) an evaluation unit, in particular for being installed or placed inside a water vessel or in the measurement unit and configured to receive the velocity data; the evaluation unit configured to (i) determine an initial position of the anchor, in particular when the anchor has reached ground and is deemed to be at rest, and (ii) determine a displacement of the anchor by (A) determining anchor velocity values from the acquired velocity data, (B) measuring at least one further physical quantity associated with the anchoring by the one or more auxiliary sensors, in particular auxiliary sensors, and (C) deciding whether the anchor is at rest or in motion, wherein a value of the further physical quantity is taken into account in the decision, for intervals when the anchor is supposed to be in motion, integrating the anchor velocity values over time.

Embodiment 16: A method for determining a displacement of an anchor, the method comprising the steps of: (a) determining an initial position of the anchor; and (b) determining a displacement of the anchor by (i) measuring anchor velocity values, preferably by a velocity sensor, in particular an ultrasonic Doppler velocity sensor, or an image processing based velocity sensor, and (ii) integrating the velocity values over time.

The aforementioned and further objectives, advantages and features of the invention will be detailed in the description of preferred embodiments below in combination with the drawing.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. The drawing consists of the following FIGURE:

FIG. 1 shows a schematic of an exemplary embodiment of a system for determining a displacement of an anchor in accordance with the present invention.

DETAILED DESCRIPTION OF THE INVENTION

A method for determining a displacement of an anchor is presented. According to the invention, the method comprises the steps of: determining an initial position of the anchor; determining a displacement of the anchor by measuring anchor velocity values, in particular as a function of time; measuring, in particular using an auxiliary sensor, at least one further physical quantity associated with the anchoring, in particular as a further function of time; deciding whether the anchor is at rest or in motion, wherein a value of the further physical quantity is taken into account in the decision; and integrating the velocity values over time during intervals when the anchor is deemed to be in motion, preferably by numerical integration.

The invention is based on the finding that a displacement of an object like, in particular, an anchor may be determined by continually measuring a velocity of the object, in particular by using a velocity sensor tightly attached to the object. By recording the measured velocity values, a numerical representation of velocity as a function of time is obtained. By integrating this function over time, a displacement of the object relative to an initial object position may be obtained, where the initial object position is an instantaneous position taken by the object at the beginning of the integration interval.

The velocity sensor may operate based on sonic, in particular ultrasonic technology, and/or may make use of Doppler effects to determine velocity, in particular its own velocity relative to one or more fixed points in space. The velocity sensor may also operate based on optical technology, in particular image processing. An image processing based velocity sensor may analyze continuously or repeatedly obtained images, in particular comprising tracking of one or more significant features, which significant features may, in particular, be produced by a light source integrated with or mounted in fixed spatial relation to the velocity sensor. Said light source may, in particular, project one or more light spots, in particular laser spots, onto an environment of the velocity sensor, in particular onto objects located near, in particular within a range of, said light source.

In a variant of the invention, the method for determining a displacement of an anchor may further comprise one of the steps of: ignoring and/or disposing of the anchor velocity values measured during intervals when the anchor is deemed to be at rest; and correcting the integration of the velocity values based on the anchor velocity values measured during intervals when the anchor is deemed to be at rest.

To minimize computational errors, which are introduced, for example, due to measurement inaccuracies and aggravated by integration, additional information about a status of the object may advantageously be taken into account in the computation. In particular, during intervals when such additional information indicates that the object is at rest, measured velocity values may be disregarded and/or replaced by zero values for the purposes of the integration. In the context of this document, the term "measured values" refers to values as obtained by measurement; in particular in the form of data acquired by a sensor. Measured values generally differ from actual values by an error. In particular, measured velocity values, also briefly referred to as "velocity values" in what follows, are obtained by velocity measurement; in particular in the form of velocity data acquired by a velocity sensor, and generally deviate from actual velocity values by a velocity error. Thus, measured velocity values obtained during intervals when the object may be deemed at rest may be completely disregarded; or, preferably, may be disregarded in an actual, preferably numerical, calculation of the integral, by replacement by zero values, or by interrupting the integration during intervals when the object may be deemed at rest, but used to correct, eliminate, or otherwise compensate for the velocity error. In addition to velocity values, measured acceleration values, also briefly referred to as "acceleration values" in what follows, may be obtained by acceleration measurement; in particular in the form of acceleration data acquired by an acceleration sensor, which generally also deviate from actual acceleration values by an acceleration error.

Additional information may further be obtained, in particular, from measurements of at least one further physical quantity of or related to the object and/or object surroundings other than velocity values. In particular, additional information may be obtained by measurements of or related to a location, orientation or velocity of the object. Preferably, additional information is obtained by measurements that are not related to quantities characteristic of a movement of the object, as in particular acceleration, velocity or position with respect to any one or more degrees of freedom of motion of the object, in particular including translational or rotational movement. Preferably, additional information may be obtained by measurements of at least one force acting on the object; measurements of pressure, temperature, magnetic and/or electric field in an environment of the object; and/or measurements of object internal quantities such as stress, tension and/or vibration all of which may provide useful additional information.

Advantageously, additional information is obtained from data, in particular velocity data, obtained from the velocity sensor. Preferably, however, additional information is obtained by using an additional sensor, in particular an auxiliary sensor, which is independent of the velocity sensor. This allows for more accurate decision of whether the object is at rest, and thus a more accurate determination of the related intervals.

Preferably, the initial position of the anchor is set when the anchor is or may be deemed to have reached ground and to be at rest, at least for a short instant. Such a situation may preferably be determined based on measurements by auxiliary sensors, in particular by at least one auxiliary sensor, possibly in combination with measured velocity values as will be detailed below.

Preferably, anchor velocity values and/or the further physical quantity or quantities is or are measured over a period of time, which is subsequently divided into one or more first intervals and one or more second intervals, wherein the anchor is deemed to be in motion during the first intervals, and deemed to be at rest during the second intervals. Whether the anchor may deemed to be in motion or deemed to be at rest may again preferably be determined based on measurements by at least one auxiliary sensor as will also be detailed below.

In a preferred variant of the method for determining a displacement of an anchor in accordance with the invention, the step of measuring at least one further physical quantity comprises measuring vibrations, in particular vibration intensity and/or vibration amplitude at one or more frequencies $f_{vib}$, preferably with $f_{vib}>250$ Hz, of the anchor. Advantageously, vibrations may be measured by a vibration detection unit configured to receive velocity data from the velocity data sensor (that acquires velocity data) and to measure vibrations of the anchor by extracting vibration data from the velocity data. Preferably, vibrations are measured, for example, by a vibration sensor integrated with, attached to or otherwise rigidly connected to the anchor. Vibration measurements thus obtained may be used in deciding whether the anchor is at rest or in motion. In particular, it may be assumed that the anchor is at rest when no vibrations are measured or when measured vibrations are below a predetermined, albeit preferably adjustable first threshold.

Vibration measurements may also be taken into account when determining the initial position of the anchor. In particular, it may be assumed that the anchor has reached the initial position when no vibrations are measured or when measured vibrations are below a predetermined, albeit preferably adjustable second threshold for a first time after the anchor has been lowered, or within a time window around an expected point in time at which the anchor may be expected to touch ground. Such a point in time may be calculated from an estimated sinking speed of the anchor, that may be approximated by known methods, and a depth at the anchoring location determined, for example, by sonar. A length of the time window T is preferably chosen in the same order of magnitude as an approximated length of time $t_s$ required for the anchor to sink, preferably $0.2t_s<T<1.5t_s$, most preferably $0.3t_s<T<0.75t_s$.

In another preferred variant of the method for determining a displacement of an anchor, the step of measuring at least one further physical quantity comprises measuring a force exerted onto the anchor through an anchor rode, for example, by a force sensor provided between the anchor and the anchor rode. Force measurements thus obtained may be used in deciding whether the anchor is at rest or in motion. In particular, it may be assumed that the anchor is at rest when no forces are measured or when measured forces are below a predetermined, albeit preferably adjustable third threshold.

Force measurements may also be taken into account when determining the initial position of the anchor. In particular, it may be assumed that the anchor has reached the initial position when no forces are measured or when measured forces are below a predetermined, albeit preferably adjustable fourth threshold for the first time after the anchor has been lowered, or within a time window around an expected point in time at which the anchor may be expected to touch ground as described above in connection with vibration measurements.

In another preferred variant of the method for determining a displacement of an anchor, the step of measuring at least one further physical quantity comprises measuring an orientation of the anchor and/or the velocity sensor, in particular a gyroscopic orientation sensor, which may be employed for determining an angle between the anchor and/or the velocity sensor and a sea floor, in particular in order top allow for a correct determination of a vector velocity in 2, preferably three spatial dimensions.

In yet another preferred variant of the method for determining a displacement of an anchor, the step of measuring at least one further physical quantity comprises measuring a pressure, in particular an underwater pressure at a location of the anchor, for example, using of a pressure sensor attached to the anchor; and/or measuring an inclination or orientation of the anchor, for example, using a compass or an inclination sensor attached to the anchor; and/or by measuring a distance between the anchor and an at least approximately fixed reference point. Measurements thus obtained may be used in deciding whether the anchor is at rest or in motion. In particular, it may be assumed that the anchor is at rest when measurements have yielded at least approximately constant values constant over a predetermined, albeit preferably adjustable period of time. Measurements thus obtained may be used in determining the initial position of the anchor in an analogous manner as described above in connection with vibration and force measurements.

In a preferred variant of the method for determining a displacement of an anchor, velocity values corresponding to intervals when the anchor is deemed to be at rest are ignored, i.e., disregarded, in the integration, and thus do not contribute to the determination of the displacement.

In another preferred variant of the method for determining a displacement of an anchor, velocity values corresponding to intervals when the anchor is deemed to be at rest are used to correct the integration during intervals when the anchor is deemed to be in motion. In particular, this may be achieved by assuming that a relation between actual velocity values $a_a(t)$ and measured velocity values $a_m(t)$ can, at least approximately, be described by $$a_m(t)=a_a(t)+e_{const}+e_{stat}(t)$$

where $e_{const}$ is an at least approximately constant error independent of time introduced by measurement, in particular by a constant offset of a velocity sensor; and $e_{stat}(t)$ is a statistical error having, at least approximately, zero average and/or integral over sufficiently large period of time. For any given second interval during which the anchor is deemed to be at rest, or any subinterval thereof, $e_{const}$ and $e_{stat}(t)$ may be determined from, in particular approximated according to $$a_m(t)=e_{const}+e_{stat}(t)$$

for example, by minimizing the average and/or integral of $e_{stat}(t)$ over the present second interval, or any subinterval thereof. The value for $e_{const}$ thus obtained may be used, for example, to correct the measured value $a_m(t)$ for one or more succeeding first intervals according to $$a(t)=a_m(t)-e_{const},$$

and using the corrected values a(t) in the integration. For the present and/or succeeding second intervals, the measured value $a_m(t)$ may be corrected in the same manner, or, preferably, it is assumed that $a(t)=a_a(t)=0$ for the present and/or succeeding second intervals; and the integration is further corrected by using the corrected values a(t) in the integration. Alternatively, the integration is preferably carried out over the subsequent first intervals only, thus obtaining a plurality of partial integrals, and by subsequently adding said partial integrals. The latter variant corresponds at least effectively to pausing the integration during the present and/or subsequent second intervals.

In yet another preferred variant of the method for determining a displacement of an anchor, the initial position of the anchor is determined from a combined observation and/or analysis of at least a pair of vibration, pressure and/or acceleration values as functions of time, where it is assumed that when the anchor hits ground, a more or less sharp acceleration peak occurs, followed by an at least momentary minimum in vibrations and an abrupt fall-off to at least approximately zero in a pressure change-rate.

The initial position is preferably determined in an automated manner by an evaluation unit which is preferably configured to also carry out the remaining method steps. Alternatively, the initial position may also be determined by an experienced skipper or helmsman based on observations of and during the anchoring process.

Further, a system for determining a displacement of an anchor is presented. In accordance with the invention, the system comprises: a measurement unit for being attached to an anchor or an anchor rode, and comprising an element for acquiring velocity data, in particular a velocity sensor; and an auxiliary measuring element for measuring at least one further physical quantity associated with the anchoring, in particular one or more auxiliary sensors; an evaluation unit, in particular for being installed or placed inside a water vessel or in the measurement unit and configured to receive the velocity data; wherein the system, in particular the evaluation unit, is configured to determine anchor velocity values, preferably as a function of time, from the acquired velocity data, and to execute the method for determining a displacement of an anchor according to any one or more of the variants as described above, using the determined velocity values and the at least one further physical quantity measured by the auxiliary measuring element, in particular by the one or more auxiliary sensors.

In a preferred embodiment of the system for determining a displacement of an anchor in accordance with the invention, the measurement unit comprises a first communication module for transmitting measurement data, in particular velocity data and data provided by the one or more auxiliary sensors, to an evaluation unit. The evaluation unit is configured to be installed or placed inside the water vessel, and comprises a second communication module configured to receive measurement data from the first communication module. Preferably, the first and second communication modules use sonic elements for transmitting and/or receiving data. In addition, the evaluation unit comprises or is connectible to a display for displaying the displacement and/or an absolute movement, for example, an absolute value of the displacement, in particular as functions of time, force, position, distance, depth and/or orientation.

In another preferred embodiment of the system for determining a displacement of an anchor, the evaluation unit is integrated with the measurement unit. In this variant, the evaluation unit or measurement unit preferably comprises or is connected to a transmitter module for transmitting displacement data determined by the evaluation unit and/or related information to a receiver module in the water vessel comprised within or connectible to a display for displaying the displacement and/or an absolute movement, e.g. an absolute value of the displacement, in particular as functions of time, force, position, distance, depth and/or orientation.

In the embodiments described above, the display may further be configured to display measured velocity values and/or the at least one measured further physical quantity, in particular as functions of time. Further, the evaluation unit or the receiver unit may comprise or be connectible to input means to allow for an input of user commands, in particular for manual setting of the initial position.

In embodiments as described above and/or below, the measurement unit; the sensor for acquiring velocity data, in particular the velocity sensor; and/or the auxiliary sensing element, in particular the one or more auxiliary sensors; are tightly connected to the anchor in order to ensure that they will remain in close proximity, preferably in physical contact to the latter to allow for exact determination of the displacement and exact measurement of the further physical quantity, in particular of vibrations. Preferably, they are rigidly attached to or fixed to, in particular integrated with, the anchor, so that they always maintain an identical relative position to the anchor. Alternatively, they may be rigidly attached to or fixed to, in particular integrated with, a shackle or chain element provided for linking, preferably releasably linking, the anchor with the anchor rode, thus constituting a connecting link.

In another preferred embodiment of the system for determining a displacement of an anchor, the system is configured to generate a warning signal, an alarm or a similar kind of notification if the displacement, in particular an absolute value of the displacement, exceeds a predetermined alarm threshold. This way, a water vessel secured with the anchor may be maintained under reduced attendance, in particular during night time or rest times of the crew, if naval and weather conditions permit. Also, remote supervision and/or automated action is possible if the system is configured to transmit the warning signal, an alarm or a similar kind of notification to a remote location, or to an additional system configured to take appropriate action in an automated manner.

According to another exemplary embodiment of the present invention, a system for monitoring an anchoring reliability is presented. The system comprises: a measurement unit for being attached to an anchor or an anchor rode, and comprising an element for acquiring velocity data, in particular a velocity sensor; and an auxiliary measuring element for measuring at least one further physical quantity associated with the anchoring, in particular one or more auxiliary sensors; an evaluation unit, in particular for being installed or placed inside a water vessel or in the measurement unit and configured to receive the velocity data; wherein the system, in particular the evaluation unit, is configured to determine an initial position of the anchor, in particular when the anchor has reached ground and may be deemed to be at rest, determine a displacement of the anchor, in particular from the initial position, determining anchor velocity values, preferably as a function of time, from the acquired velocity data, measuring at least one further physical quantity, preferably as a function of time, associated with the anchoring using the auxiliary measuring element, in particular by the one or more auxiliary sensors, deciding whether the anchor is at rest or in motion, wherein a value of the further physical quantity is taken into account in the decision, and integrating the anchor velocity values over time for intervals when the anchor is supposed to be in motion.

FIG. 1 shows a schematic of an exemplary embodiment of a system for determining a displacement of an anchor in accordance with the present invention.

As an exemplary water vessel, a yacht 2 is anchored using an anchor 1 resting on a seafloor at a current position. The anchor 1 is fixed to an anchor rode 3 using a connecting link 11. The anchor rode is further attached to yacht 2 at an end remote from connecting link 11.

Connecting link 11 comprises a measurement unit which—as detailed above—in turn comprises an element for acquiring velocity data, in particular a velocity sensor; as well as one or more auxiliary sensors for measuring at least one further physical quantity associated with the anchoring.

The measurement unit further comprises a first communication module for sonically transmitting measurement data, in particular velocity data and data provided by the one or more auxiliary sensors, to an evaluation unit located in yacht 2. The evaluation unit comprises a second communication module 21 configured to receive measurement data from the first communication module. The evaluation unit is connected to a graphic display 22 located in yacht 2.

A touchdown location at which the anchor first touched the seafloor upon lowering is indicated by reference symbol 1'.

The evaluation unit is configured to determine anchor velocity values from the acquired velocity data, and execute the method for determining a displacement of an anchor as previously described, using the determined velocity values and the at least one further physical quantity measured by the one or more auxiliary sensors.

Although the invention is illustrated and described herein with reference to specific embodiments, the invention is not intended to be limited to the details shown. Rather, various modifications may be made in the details within the scope and range of equivalents of the claims and without departing from the invention.

It should be noted that the term "comprising" does not exclude other features, in particular elements or steps, and that the indefinite articles "a" or "an" do not exclude a plurality of the elements or steps said articles relate to. Further, elements or steps as described in association with two or more different individual embodiments may be combined.

The invention claimed is:

1. A method for determining a displacement of an anchor, the method comprising the steps of:
   (a) determining an initial position of the anchor; and
   (b) determining a displacement of the anchor by
      i. measuring anchor velocity values, preferably by a velocity sensor, in particular an ultrasonic Doppler velocity sensor, or an image processing based velocity sensor,
      ii. measuring at least one further physical quantity associated with anchoring of the anchor,
      iii. deciding whether the anchor is at rest or in motion, wherein a value of the further physical quantity is taken into account in the decision, and
      iv. during intervals when the anchor is deemed to be in motion, integrating the anchor velocity values over time,
   the method further comprising the step of activating the velocity sensor when measurements from an auxiliary sensor indicate that a predetermined condition is fulfilled, in particular when measured data values obtained by from the auxiliary sensor exceed a predetermined or previously adjusted threshold,
   wherein the step of activating the velocity sensor comprises transitioning of the velocity sensor from a switched off, low power or idle state into a normal power state, in which a nominal amount of power is preferably consumed by the velocity sensor, in particular by reconnecting or re-establishing power supply to the velocity sensor.

2. The method according to claim 1, further comprising at least one of the steps of ignoring and/or disposing of the anchor velocity values measured during intervals when the anchor is deemed to be at rest, and/or switching off the velocity sensor, in particular by at least temporarily interrupting a power supply to the velocity sensor, or putting the velocity sensor into an idle state or a low power state in which a reduced amount of energy is, in particular as compared to a normal operation state, consumed by and/or provided to the velocity sensor.

3. The method according to claim 1, further comprising the step of correcting integration of the anchor velocity values based on the anchor velocity values measured during intervals when the anchor is deemed to be at rest.

4. The method according to claim 1, wherein the step of measuring at least one further physical quantity comprises measuring vibrations of the anchor, and/or measuring a force exerted onto the anchor through an anchor rode, and/or measuring an underwater pressure at a location of the anchor, and/or measuring a distance between the anchor and a fixed reference point, in particular measuring a distance between the anchor and a water vessel, and/or measuring an inclination or orientation of the anchor.

5. The method according to claim 1 further comprising the step of monitoring an anchoring reliability, the step of monitoring the anchoring reliability including generating a warning message or signal if the displacement determined in step (b) exceeds a predetermined alarm threshold.

6. A system for determining a displacement of an anchor, the system comprising:
(a) a measurement unit for being attached to an anchor and/or an anchor rode, the measurement unit including
  i. a velocity sensor for acquiring velocity data, preferably an ultrasonic Doppler velocity sensor or an image processing based velocity sensor, and
  ii. an auxiliary sensor for measuring at least one further physical quantity associated with anchoring of the anchor; and
(b) an evaluation unit, in particular for being installed or placed inside a water vessel or in the measurement unit and configured to receive the velocity data,
the evaluation unit being configured to
  i. determine anchor velocity values from the acquired velocity data,
  ii. execute the method according to claim 1.

7. The system according to claim 6, wherein the auxiliary sensor includes one or more auxiliary sensors, in particular an acceleration sensor.

8. The system according to claim 6, wherein the auxiliary sensor includes a vibration detection unit configured to receive velocity data from the velocity sensor, and to measure vibrations, in particular an intensity and or an amplitude of vibrations, of the anchor by extracting vibration data from the velocity data.

9. The system according to claim 6, further comprising a display configured to display, in particular by a graphical representation, the displacement and/or an absolute movement, e.g., an absolute value of the displacement, of the anchor, in particular as a function of time, force, position, distance, depth and/or orientation.

10. The system according to claim 6, configured to generate a warning message or signal if the displacement, in particular an absolute value of the displacement, exceeds a predetermined alarm threshold.

11. The system according to claim 6, wherein the auxiliary sensor includes at least one of a pressure sensor for measuring underwater pressure; a vibration sensor for measuring vibrations of the anchor; an ultrasound sensor, in particular for measuring a distance between anchor and vessel; and a force sensor for measuring a force exerted onto the anchor through an anchor rode.

12. A system for determining a displacement of an anchor, the system comprising:
(a) a measurement unit for being attached to an anchor or an anchor rode, the measurement unit including
  i. a velocity sensor for acquiring velocity data, preferably an ultrasonic Doppler velocity sensor or an image processing based velocity sensor, and
  ii. one or more auxiliary sensors; and
(b) an evaluation unit, in particular for being installed or placed inside a water vessel or in the measurement unit and configured to receive the velocity data,
the evaluation unit being configured to
  i. determine an initial position of the anchor, in particular when the anchor has reached ground and is deemed to be at rest, and
  ii. determine a displacement of the anchor by
    A. determining anchor velocity values from the acquired velocity data,
    B. measuring at least one further physical quantity associated with anchoring of the anchor using the one or more auxiliary sensors,
    C. deciding whether the anchor is at rest or in motion, wherein a value of the further physical quantity is taken into account in the decision, and
    D. for intervals when the anchor is supposed to be in motion, integrating the anchor velocity values over time,
  the determination of the displacement of the anchor further comprising activating the velocity sensor when measurements from the one or more auxiliary sensors indicate that a predetermined condition is fulfilled, in particular when measured data values obtained by from the one or more auxiliary sensors exceed a predetermined or previously adjusted threshold,
  wherein the step of activating the velocity sensor comprises transitioning of the velocity sensor from a switched off, low power or idle state into a normal power state, in which a nominal amount of power is preferably consumed by the velocity sensor, in particular by reconnecting or re-establishing power supply to the velocity sensor.

13. The system according to claim 12, wherein the evaluation unit is configured to disregard velocity values relating to intervals when the anchor is supposed to be at rest when integrating over time, in particular by replacing said velocity values by zero values, or by pausing the integration.

* * * * *